US012101466B2

(12) United States Patent
Shima

(10) Patent No.: US 12,101,466 B2
(45) Date of Patent: Sep. 24, 2024

(54) IMAGE ENCODING DEVICE, IMAGE ENCODING METHOD, AND PROGRAM, IMAGE DECODING DEVICE, IMAGE DECODING METHOD, AND NON-TRANSITORY COMPUTER-READABLE STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 17/690,881

(22) Filed: Mar. 9, 2022

(65) Prior Publication Data

US 2022/0201287 A1 Jun. 23, 2022

Related U.S. Application Data

(63) Continuation of application No. PCT/JP2020/030903, filed on Aug. 14, 2020.

(30) Foreign Application Priority Data

Sep. 17, 2019 (JP) ................................ 2019-168859

(51) Int. Cl.
*H04N 19/105* (2014.01)
*H04N 19/124* (2014.01)
(Continued)

(52) U.S. Cl.
CPC ......... *H04N 19/105* (2014.11); *H04N 19/124* (2014.11); *H04N 19/176* (2014.11); *H04N 19/186* (2014.11); *H04N 19/61* (2014.11)

(58) Field of Classification Search
CPC ............... H04N 19/105; H04N 19/124; H04N 19/176; H04N 19/186; H04N 19/61;
(Continued)

(56) References Cited

U.S. PATENT DOCUMENTS 9,596,479 B2 3/2017 Liu
2004/0179596 A1 9/2004 Song et al.
(Continued)

FOREIGN PATENT DOCUMENTS

CN 104221383 A 12/2014
CN 105580368 A 5/2016
(Continued)

OTHER PUBLICATIONS

Karczewicz et al., "Non-CE8: Minimum QP for Transform Skip Mode," 15. JVET Meeting; Jul. 3, 2019-Jul. 12, 2019; Gothenburg; The Joint Video Exploration Team of ISO/IEC JTC1/SC29/WG11 and ITU-T SG. 16, No. JVET-O0919, Jul. 5, 2019, XP30220542 (Year: 2019).*

(Continued)

*Primary Examiner* — Sath V Perungavoor
*Assistant Examiner* — Tyler B Edwards
(74) *Attorney, Agent, or Firm* — Canon U.S.A., Inc. IP Division

(57) ABSTRACT

An encoding device, if it is determined that a transforming processing is applied to a block to be encoded, encodes the block using a first quantization parameter, if it is determined that the transforming processing is not applied to the block and the first quantization parameter is less than a reference value, encodes the block using the reference value as a quantization parameter, and, if it is determined that a pallet mode is applied to the block and the first quantization parameter is less than a reference value, encodes the block using the reference value as a quantization parameter for an escape value, wherein the reference value used if it is determined that the transforming processing is not applied to the block and the reference value used for the escape value are the same.

6 Claims, 8 Drawing Sheets

(51) Int. Cl.
*H04N 19/176* (2014.01)
*H04N 19/186* (2014.01)
*H04N 19/61* (2014.01)

(58) Field of Classification Search
CPC .... H04N 19/12; H04N 19/593; H04N 19/126; H04N 19/157; H04N 19/70; H04N 19/46
See application file for complete search history.

(56) References Cited

U.S. PATENT DOCUMENTS

| | | |
|---|---|---|
| 2016/0227247 A1 | 8/2016 | Zou |
| 2017/0085891 A1* | 3/2017 | Seregin ............... H04N 19/182 |
| 2017/0332091 A1 | 11/2017 | Maeda |

FOREIGN PATENT DOCUMENTS

| | | | |
|---|---|---|---|
| JP | 2015521826 A | 7/2015 | |
| JP | 2016103804 A | 6/2016 | |
| JP | 2017060177 A | 3/2017 | |
| JP | 2018532319 A | 11/2018 | |
| WO | 2014/001547 A2 | 1/2014 | |
| WO | 2015012600 A1 | 1/2015 | |
| WO | 2017/049119 A1 | 3/2017 | |
| WO | 2019/003676 A1 | 1/2019 | |
| WO | 2021/003241 A1 | 1/2021 | |

OTHER PUBLICATIONS

Takeshi Tsukuba, et al., AHG13/Non-CE6/CE8: Chroma Transform Skip, Joint Video Experts Team (JVET) of ITU-T SG 16 WP 3 and ISO/IEC JTC 1/SC 29/WG 11, 14th Meeting, Geneva, CH, Mar. 19-27, 2019, Doc. No. JVET-N0123-v1.

Tsukuba, Takeshi, et al., CE8: Chroma Transform Skip (CE8-3.2), Joint Video Experts Team (JVET) of ITU-T SG 16 WP 3 and ISO/IEC JTC 1/SC 29/WG 11, 15th Meeting: Gothenburg, SE, Jul. 3-12, 2019, Doc. No. JVET-O0081-v2.

Zhao, Jie, et al., Non-GE8: Minimum QP for Palette Escape Coding, Joint Video Experts Team (JVET) of ITU-T SG 16 WP 3 and ISO/IEC JTC 1/SC 29/WG 11, 16th Meeting: Geneva, CH, 16th Meeting: Geneva, CH, Oct. 1-11, 2019, Doc. No. JVET-P0460.

Chao, Yung-Hsuan, et al., Non-CE8: Minimum QP for escape mode in palette, Joint Video Experts Team (JVET) of ITU-T SG 16 WP 3 and ISO/IEC JTC I/SC 29/ WG 11, 16th Meeting: Geneva, CH, Oct. 1-11, 2019, Doc. No. JVET-P0474.

Nguyen, Tung et al., Non-CE8: Minimum Allowed QP for Transform Skip Mode, Joint Video Experts Team (JVET) of ITU-T SG 16 WP 3 and ISO/IEC JTC 1/SC 29/ WG 11, 15th Meeting: Gothenburg, SE, Jul. 3-12, 2019, Doc. No. JVET-O0405-v1.

Tsukuba, Takeshi, et al., AHG13/Non-CE6/CE8: Chroma Transform Skip, Joint Video Experts Team (JVET) of ITU-T SG 16 WP 3 and ISO/IEC JTC 1/SC 29/WC 11, 14th Meeting: Geneva, CH, Mar. 19-27, 2019, Doc. No. JVET-N0123-v2.

Karczewicz, Marta, et al., Non-CE8: Minimum QP for Transform Skip Mode, Joint Video Experts Team (JVET) of ITU-T SG 16 WP 3 and ISO/IEC JTC 1/SC 29/WG 11, 15th Meeting: Gothenburg, SE, Jul. 2019, pp. 1-3, Doc. No. JVET-O0919-v2.

Tsukuba, Takeshi, et al., CE8: Chroma Transform Skip (CE8-3.2), Joint Video Experts Team (JVET) of ITU-T SG 16 WP 3 and ISO/IEC JTC 1/SC 29/WG 11, 15th Meeting: Gothenburg, SE, Jul. 3-12, 2019, Doc. No. JVET-O0081-v1.

* cited by examiner

IMAGE ENCODING DEVICE, IMAGE ENCODING METHOD, AND PROGRAM, IMAGE DECODING DEVICE, IMAGE DECODING METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2020/030903, filed Aug. 14, 2020, which claims the benefit of Japanese Patent Application No. 2019-168859, filed Sep. 17, 2019, both of which are hereby incorporated by reference herein in their entirety.

BACKGROUND OF THE INVENTION

Field of the Invention

The present invention relates to an image encoding device, an image encoding method, and a program, and to an image decoding device, an image decoding method, and a non-transitory computer-readable storage medium.

Background Art

The High Efficiency Video Coding (HEVC) encoding method ("HEVC" hereinafter) is known as a compressed encoding method for moving images.

Recently, activities have been initiated to develop an international standard for an even more efficient encoding method as a successor to HEVC, and ISO-IEC and ITU-T have jointly established the Joint Video Experts Team (JVET). JVET is advancing the standardization of the Versatile Video Coding (VVC) encoding method ("VVC" hereinafter), which is a successor encoding method to HEVC.

In these encoding methods, a method called "palette encoding" is being considered as a way to improve the encoding efficiency for artificially-created images that are not natural images. This technique determines, in advance, a representative color that represents the image, and encodes input pixel values using an index that indicates this representative color. Japanese Patent Laid-Open No. 2016-103804 (PTL 1) discloses a technique for correcting a quantization parameter used in this palette encoding.

Here, in HEVC, VVC, and the like, the quantization step (scaling factor) is designed to be 1 when the quantization parameter used in the quantization processing is 4. In other words, the quantization step is designed such that when the quantization parameter is 4, the value does not change between before and after quantization. In other words, if the quantization parameter is greater than 4, the quantization step will be greater than 1, and the quantized value will be smaller than the original value. Conversely, if the quantization parameter is smaller than 4, the quantization step becomes a fractional value smaller than 1, and the quantized value becomes larger than the original value, resulting in an effect of increased gradations. With encoding processing using a normal orthogonal transform, setting the quantization parameter to be smaller than 4 increases the gradations and therefore has an effect of improving the image quality after compression compared to when the quantization parameter is 4. On the other hand, encoding processing that does not use an orthogonal transform has a problem in that the image quality after compression does not improve even if the gradations are increased, and there is a greater amount of code.

CITATION LIST

Patent Literature

PTL 1: Japanese Patent Laid-Open No. 2016-103804

SUMMARY OF INVENTION

Having been achieved in order to solve the above-described problem, the present invention provides a technique that suppresses an unnecessary increase in an amount of code by adaptively correcting a quantization parameter.

According to an aspect of the invention, there is provided an image encoding device encoding an image to generate a bitstream, comprising:
a first determining unit configured to, in a case where a prediction encoding mode is used for a block to be encoded, determine whether a transforming processing is applied to the block to be encoded; and
an encoding unit configured to, in a case where the first determining unit determines that the transforming processing is applied to the block to be encoded, encode the block to be encoded using a first quantization parameter corresponding to the block to be encoded,
wherein in a case where the first determining unit determines that the transforming processing is not applied to the block to be encoded and the first quantization parameter is less than a reference value, the encoding unit encodes the block to be encoded using the reference value as a quantization parameter,
wherein the device further comprising:
a second determining unit configured to determine whether a palette mode is applied to the block to be encoded,
wherein in a case where the second determining unit determines that the pallet mode is applied to the block to be encoded and the first quantization parameter is less than a reference value, the encoding unit encodes the block to be encoded using the reference value as a quantization parameter for an escape value,
wherein the reference value used if the first determining unit determines that the transforming processing is not applied to the block to be encoded and the reference value used for the escape value are the same.

Further features of the present invention will become apparent from the following description of exemplary embodiments with reference to the attached drawings.

DESCRIPTION OF EMBODIMENTS

Embodiments of the present invention will be described hereinafter on the basis of the appended drawings. It should be noted that the configurations described in the following embodiments are examples, and that the present invention is not intended to be limited to the configurations described in the following embodiments. Note that terms such as "basic block" and "sub-block" are terms used for convenience in the embodiments, and other terms may be used as appropriate to the extent that the meanings thereof remain unchanged. For example, "basic block" and "sub-block" may be called "base unit" and "sub-unit", or may simply be called "blocks" or "units".

First Embodiment

An embodiment of the present invention will be described hereinafter with reference to the drawings.

Figure 1:
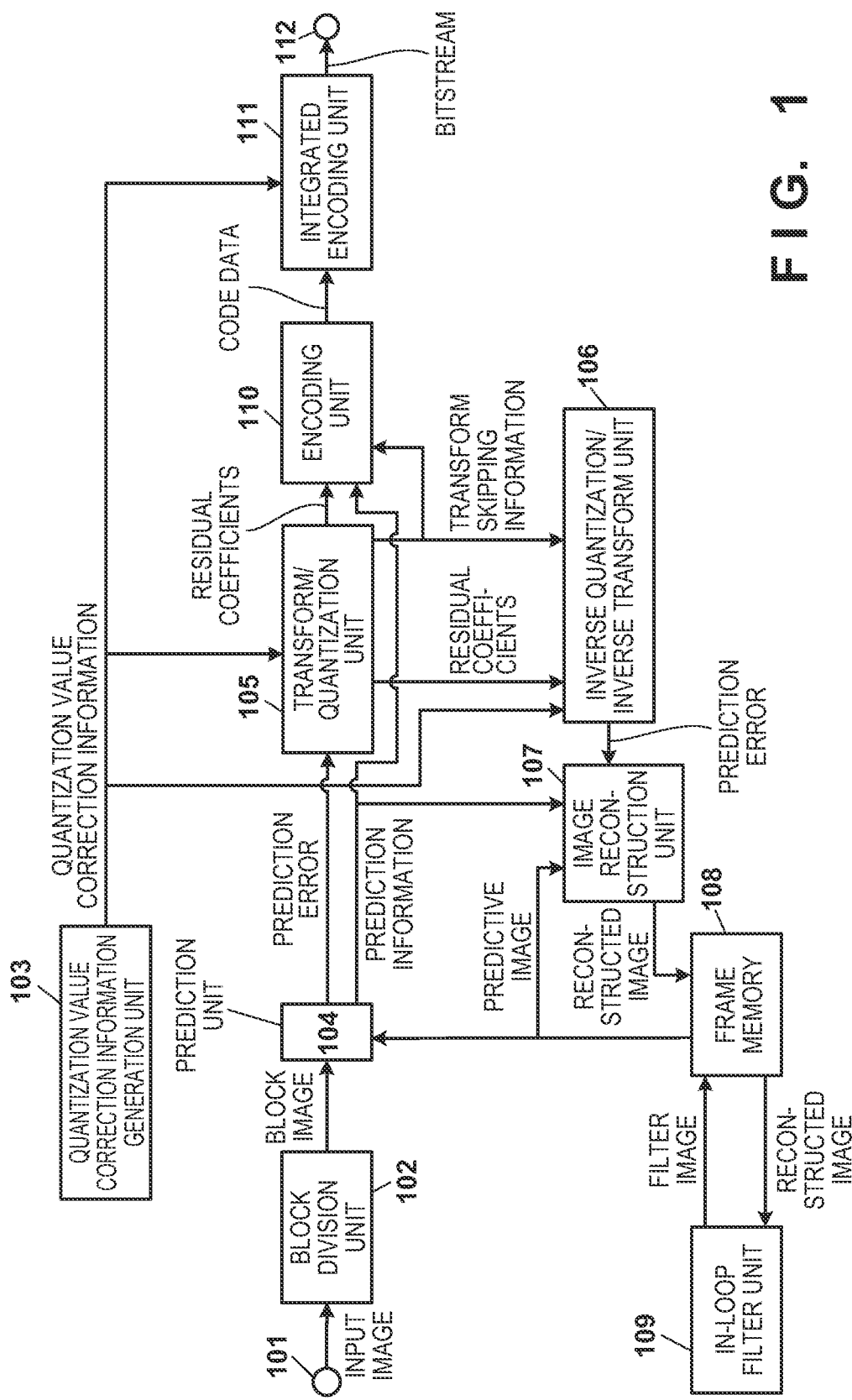
FIG. 1 is a block diagram illustrating the configuration of an image encoding device according to a first embodiment.

FIG. 1 is a block diagram illustrating an image encoding device according to the present embodiment. In FIG. 1, 101 indicates a terminal into which image data is input.

102 is a block division unit, which divides an input image into a plurality of basic blocks and outputs the image in basic block units to later stages. For example, a block of 128×128 pixels may be used as the basic block, or a block of 32×32 pixels may be used as the basic block.

103 is a quantization value correction information generation unit, which generates quantization value correction information that is information about processing of correcting a quantization parameter that defines a quantization step. The method for generating the quantization value correction information is not particularly limited, but a user may make an input designating the quantization value correction information, the image encoding device may calculate the quantization value correction information from the characteristics of the input image, or a value designated in advance as an initial value may be used. Note that the quantization parameter does not directly indicate the quantization step, e.g., the design is such that when the quantization parameter is 4, the quantization step (scaling factor) is 1. The quantization step increases with the value of the quantization parameter.

104 is a prediction unit, which determines a method for dividing the image data in the basic block unit into sub-blocks. The basic block is then divided into sub-blocks having the shape and size determined. Predictive image data is then generated by performing intra prediction, which is prediction within a frame in units of sub-blocks, inter prediction, which is prediction between frames, and the like. For example, the prediction unit 104 selects the prediction method to be performed for one sub-block from among intra prediction, inter prediction, and predictive encoding that combines intra prediction and inter prediction, performs the selected prediction, and generates the predictive image data for the sub-block. The prediction unit 104 also functions as a determination means for determining what kind of encoding is to be performed on the basis of a flag or the like.

The prediction unit 104 furthermore calculates and outputs prediction error from the input image data and the predictive image data. For example, the prediction unit 104 calculates a difference between each pixel value in the sub-block and each pixel value in the predictive image data generated through the prediction for that sub-block as the prediction error.

The prediction unit 104 also outputs information necessary for prediction along with the prediction error. The "information necessary for prediction" is, for example, information indicating the division state of the sub-blocks, a prediction mode indicating the prediction method for the sub-blocks, motion vectors, and the like. The information necessary for prediction will be called "prediction information" hereinafter. In cases such as when there are few types of colors (pixel values) used in the sub-block, it can be determined that palette encoding using a palette can compress the data more efficiently. This determination may be made by the image encoding device or a user. When such a determination is made, palette encoding can be selected as the method for generating the predictive image data. A "palette" has one or more entries that are associated with information indicating a color and an index for specifying the information indicating that color.

When palette encoding is selected, a flag indicating that palette encoding is to be used (called a "palette flag" hereinafter) is output as the prediction information. An index indicating which color in the palette is used by each pixel is also output as the prediction information. Furthermore, information indicating colors that do not exist in the palette (for which there is no corresponding entry) (called an "escape value" hereinafter) is also output as the prediction information. In this manner, in palette encoding, colors that do not exist in the palette can be encoded using information that directly indicates the value of the color, without using the palette, as the escape value. For example, the prediction unit 104 can perform encoding using escape values for specific pixels in a sub-block to be encoded using palette encoding. In other words, the prediction unit 104 can decide whether or not to use escape values on a pixel-by-pixel basis. Encoding using escape values is also called "escape encoding".

105 is a transform quantization unit that performs an orthogonal transform (orthogonal transform processing) on the aforementioned prediction error in units of sub-blocks and obtains transform coefficients representing each of frequency components of the prediction error. The transform quantization unit 105 is a transform/quantization unit that further performs quantization on the transform coefficients to obtain residual coefficients (quantized transform coefficients). If transform skipping, palette encoding, or the like is used, the orthogonal transform processing is not performed. Note that the function for performing orthogonal transforms and the function for performing quantization may be provided separately.

106 is an inverse quantization/inverse transform unit that inverse-quantizes the residual coefficients output from the transform/quantization unit 105, reconstructs the transform coefficients, and further performs an inverse orthogonal transform (inverse orthogonal transform processing) to reconstruct the prediction error. If transform skipping, palette encoding, or the like is used, the inverse orthogonal transform processing is not performed. This processing for reconstructing (deriving) the orthogonal transform coefficients will be called "inverse quantization". Note that the function for performing the inverse quantization and the function for performing the inverse orthogonal transform processing may be provided separately. 108 is frame memory for storing the reconstructed image data.

107 is an image reconstruction unit. The image reconstruction unit 107 generates predictive image data by referring to the frame memory 108 as appropriate on the basis of the prediction information output from the prediction unit 104, generates reconstructed image data from the predictive image data and the input prediction error, and outputs the reconstructed image data.

109 is an in-loop filter unit. The in-loop filter unit 109 performs in-loop filter processing, such as deblocking filtering and sample adaptive offset, on the reconstructed image, and then outputs the filtered image.

110 is an encoding unit. The encoding unit 110 generates code data by coding the residual coefficients output from the transform/quantization unit 105 and the prediction information output from the prediction unit 104, and outputs the code data.

111 is an integrated encoding unit. The integrated encoding unit 111 encodes the output from the quantization value correction information generation unit 103 and generates header code data. The integrated encoding unit 111 also generates and outputs a bitstream along with the code data output from the encoding unit 110. The information indicating the quantization parameter is also encoded in the bitstream. For example, the information indicating the quantization parameter is information indicating a difference value between the quantization parameter to be encoded and another quantization parameter (e.g., the quantization parameter of the previous sub-block).

112 is a terminal, which outputs the bitstream generated by the integrated encoding unit 111 to the exterior.

A description of the operations for encoding an image in the image encoding device will be given next. Although the present embodiment assumes a configuration in which moving image data is input in units of frames (in units of pictures), the configuration may be such that one frame's worth of still image data is input.

Prior to encoding an image, the quantization value correction information generation unit 103 generates the quantization value correction information used to correct the quantization parameter at a later stage if transform skipping, palette encoding, or the like is used. It is sufficient for the quantization value correction information generation unit 103 to at least generate the quantization value correction information if either transform skipping or palette encoding is used. However, in either case, generating quantization correction information can further reduce the amount of code. The present embodiment assumes that the quantization value correction information includes, for example, information indicating QPmin, which is the minimum quantization value (minimum QP value) for correcting the quantization parameter. For example, if the quantization parameter is smaller than QPmin, the quantization parameter is corrected to QPmin. A detailed description of how this quantization value correction information is used will be given below. The method for generating the quantization value correction information is not particularly limited, but a user may input (designate) the quantization value correction information, the image encoding device may calculate the quantization value correction information from the characteristics of the input image, or an initial value designated in advance may be used. A value indicating that the quantization step is 1 (e.g., 4) may be used as the initial value. If transform skipping, palette encoding, or the like is used, the image quality will be the same as if the quantization step is 1 even if a quantization step of less than 1 is used, and setting QPmin to 4 is therefore suitable when transform skipping, palette encoding, or the like is used. Note that when QPmin is set to the initial value, the quantization value correction information can be omitted. As will be described later, if QPmin is set to a value aside from the initial value, the difference value from the initial value may be used as the quantization value correction information.

Additionally, the quantization value correction information may be determined on the basis of implementation limitations when determining whether or not to use palette encoding in the prediction unit 104. Additionally, the quantization value correction information may be determined on the basis of implementation limitations when determining whether or not to perform an orthogonal transform in the transform/quantization unit 105.

The generated quantization value correction information is then input to the transform/quantization unit 105, the inverse quantization/inverse transform unit 106, and the integrated encoding unit 111.

One frame's worth of image data input from the terminal 101 is input to the block division unit 102.

The block division unit 102 divides the input image data into a plurality of basic blocks, and outputs the image in units of basic blocks to the prediction unit 104.

The prediction unit 104 executes prediction processing on the image data input from the block division unit 102. Specifically, first, sub-block division for dividing the basic block into smaller sub-blocks is set.

Figure 7A:
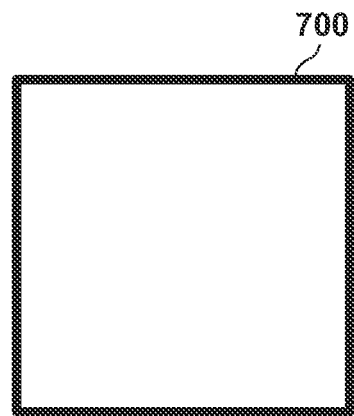
FIG. 7A is a diagram illustrating an example of sub-block division used in the embodiments.
Figure 7B:
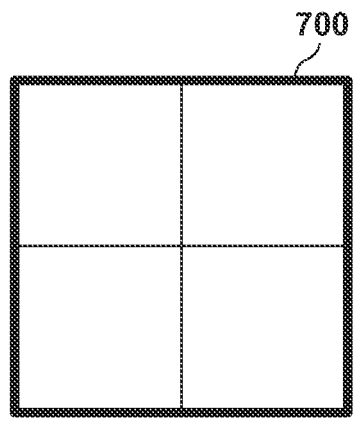
FIG. 7B is a diagram illustrating an example of sub-block division used in the embodiments.
Figure 7C:
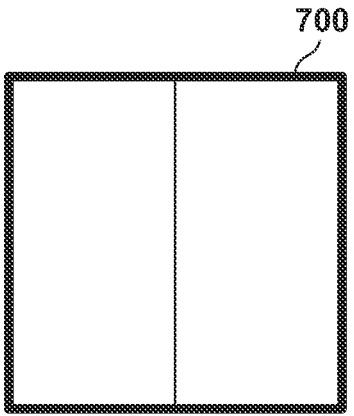
FIG. 7C is a diagram illustrating an example of sub-block division used in the embodiments.
Figure 7D:
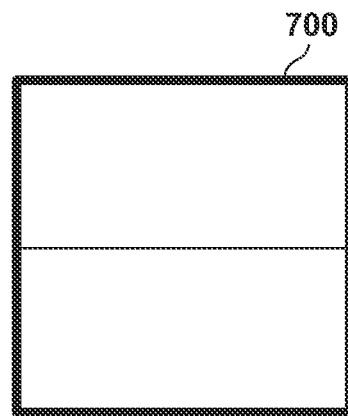
FIG. 7D is a diagram illustrating an example of sub-block division used in the embodiments.
Figure 7E:
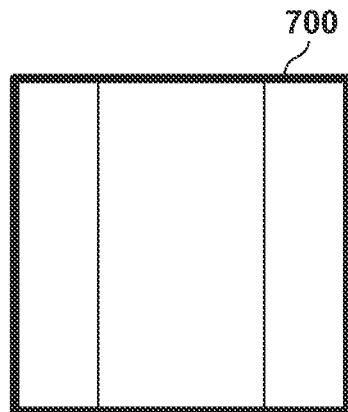
FIG. 7E is a diagram illustrating an example of sub-block division used in the embodiments.
Figure 7F:
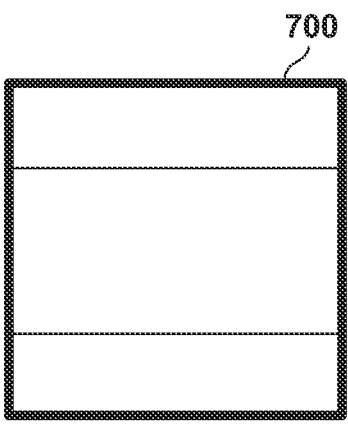
FIG. 7F is a diagram illustrating an example of sub-block division used in the embodiments.

FIGS. 7A to 7F illustrate examples of sub-block division methods. The bold frame indicated by 700 represents the basic block, and to simplify the descriptions, a 32×32-pixel configuration is assumed, with each quadrangle within the bold frame representing a sub-block. FIG. 7B illustrates an example of conventional square sub-block division, where a 32×32-pixel basic block is divided into four sub-blocks, each having a size of 16×16 pixels. On the other hand, FIGS. 7C to 7F illustrate examples of rectangular sub-block division. FIG. 7C illustrates an example of the division of a basic block into two longitudinal sub-blocks, each having a with a size of 16×32 pixels. In FIG. 7D, the basic block is divided into two longitudinally rectangular sub-blocks, each having a size of 32×16 pixels. In FIGS. 7E and 7F, the basic block is divided into three rectangular sub-blocks at a ratio of 1:2:1. In this manner, the encoding processing is performed using not only square sub-blocks, but also rectangular sub-blocks.

Although the present embodiment assumes that only the block illustrated in FIG. 7A, which is not divided, is used as a 32×32-pixel basic block, the sub-block division method is not limited thereto. Quad-tree division such as that illustrated in FIG. 7B, trichotomous tree division such as that illustrated in FIGS. 7E and 7F, or dichotomous tree division such as that illustrated in FIGS. 7C and 7D may be used as well.

The prediction unit 104 then determines the prediction mode for each sub-block to be processed (block to be encoded). Specifically, the prediction unit 104 determines, on a sub-block basis, the prediction mode to be used, such as intra prediction using pixels already encoded in the same frame as the frame containing the sub-block to be processed, inter prediction using pixels from a different encoded frame, or the like.

The prediction unit 104 generates the predictive image data on the basis of the determined prediction mode and the already-encoded pixels, furthermore generates the prediction error from the input image data and the predictive image data, and outputs the prediction error to the transform/quantization unit 105.

The prediction unit 104 also outputs information such as the sub-block division, the prediction mode, and the like to the encoding unit 110 and the image reconstruction unit 107 as the prediction information. However, for each sub-block to be processed, palette encoding can be selected instead of a prediction mode such as intra prediction and inter prediction. In this case, the palette flag indicating whether palette encoding is used is output as the prediction information. Then, if palette encoding is selected for that sub-block (e.g., the palette flag is 1), the index, escape values, and the like indicating the color information contained in the palette corresponding to each pixel are also output as the prediction information.

On the other hand, if palette encoding is not selected for that sub-block, i.e., if a prediction mode such as intra prediction or inter prediction is selected (e.g., the value of the palette flag is 0), other prediction information, the prediction error, and so on are output following the palette flag.

The transform/quantization unit 105 performs the orthogonal transform processing, quantization processing, and the like on the prediction error output from the prediction unit 104. Specifically, first, it is determined whether or not to perform the orthogonal transform processing on the prediction error of a sub-block using a prediction mode aside from palette encoding, such as intra prediction or inter prediction. Here, consider image encoding for a natural image, such as one generated by shooting a landscape, a person, or the like with a camera. Generally, in such image encoding, it is possible to reduce the amount of data without a noticeable drop in image quality by performing an orthogonal transform on the prediction error, breaking the result down into frequency components, and performing quantization processing that matches the vision characteristics of humans. On the other hand, high-frequency components are large in artificial images (e.g., computer graphics), where the boundaries of objects in the image are prominent. Therefore, in some cases, using orthogonal transforms can actually increase the amount of data. Accordingly, the transform/quantization unit 105 determines whether or not to perform an orthogonal transform for each color component (Y, Cb, Cr) in the sub-block, and generates a determination result as transform skipping information. In other words, the transform skipping information can be generated for each color component (Y, Cb, Cr). In other words, whether or not to perform transform skipping may be determined for each color component. For example, two types of the transform skipping information, namely one for the luma component (Y) and one for the chroma components (Cb and Cr), may be generated.

If it is determined that the orthogonal transform processing is to be performed on the color component (Y, Cb, or Cr) of the sub-block, the orthogonal transform processing is performed on the prediction error corresponding to that color component, and orthogonal transform coefficients are generated. Then, quantization processing is performed using the quantization parameter, and residual coefficients are generated. The method for determining the actual value of the quantization parameter used here is not particularly limited, but the user may input the quantization parameter, or the image encoding device may calculate the quantization parameter from the characteristics of the input image (the image complexity or the like). A value designated in advance as an initial value may be used as well. The present embodiment assumes that a quantization parameter QP is calculated by a quantization parameter calculation unit (not shown) and input to the transform/quantization unit 105. The orthogonal transform coefficients of the luma component (Y) of the sub-block are quantized using the quantization parameter QP, and the residual coefficients are generated. On the other hand, the orthogonal transform coefficients of the Cb component of the sub-block are quantized using a quantization parameter QPcb, in which the quantization parameter QP has been adjusted for the Cb component, and the residual coefficients are generated. Likewise, the orthogonal transform coefficients of the Cr component of the sub-block are quantized using a quantization parameter QPcr, in which the quantization parameter QP has been adjusted for the Cr component, and the residual coefficients are generated. The method for calculating QPcb and QPcr from QP is not particularly limited, but a table for the calculation may be prepared in advance. The table used to calculate QPcb and QPcr may also be encoded separately so that the same QPcb and QPcr can be calculated on the decoding side. If the table used for the calculation is encoded separately, the table is encoded in the sequence of the bitstream or in the header part of the picture by the integrated encoding unit 111 in a later stage.

On the other hand, if it is determined that the orthogonal transform processing is not to be performed on the color component of the sub-block, i.e., if it is determined that transform skipping is to be performed, the prediction error is quantized using a corrected quantization parameter obtained by correcting the quantization parameter QP, and the residual coefficients are generated. Specifically, the prediction error of the luma component (Y) of the sub-block is quantized using QP', which is obtained by correcting the aforementioned QP, and the residual coefficients are generated. On the other hand, the prediction error of the Cb component of the sub-block is quantized using QPcb', which is obtained by correcting the aforementioned QPcb, and the residual coefficients are generated. Likewise, the prediction error of the Cr component of the sub-block is quantized using QPcr', which is obtained by correcting the aforementioned QPcr, and the residual coefficients are generated.

A specific method for calculating the corrected quantization parameters (QP', QPcb', and QPcr') from the quantization parameters (QP, QPcb, and QPcr) will be described here. The following Formulas (1) to (3), indicating predetermined determinations, are formulas for calculating the corrected quantization parameters (QP', QPcb', and QPcr') from the quantization parameters (QP, QPcb, and QPcr). QPmin is the minimum QP value (minimum value) used in the correction processing, input from the quantization value correction information generation unit 103.

$$QP' = \text{Max}(QP\text{min}, QP) \quad (1)$$

$$QPcb' = \text{Max}(QP\text{min}, QPcb) \quad (2)$$

$$QPcr' \text{Max}(QP\text{min}, QPcr) \quad (3)$$

(Here, Max(A,B) represents the larger of A and B.)

For example, in the above Formulas (1) to (3), if QPmin, which is the minimum QP value, is 4, the corrected quantization parameters (QP', QPcb', and QPcr') will never be lower than 4. In other words, the quantization step will no longer be less than 1, which makes it possible to prevent an unnecessary increase in the amount of code when transform skipping is used. Although the configuration may be such that different minimum QP values are set for each of the Y, Cb, and Cr color components, in the present embodiment, the same minimum QP value, i.e., QPmin, is applied to all color components.

The residual coefficients and transform skipping information generated in this manner are input to the inverse quantization/inverse transform unit 106 and the encoding unit 110.

Processing performed when the sub-block is palette-encoded will be described next. In palette encoding, no orthogonal transform processing is performed because no prediction error arises to begin with. The quantization processing is also not performed on pixels for which an index indicating colors included in the palette is set.

On the other hand, for pixels having escape values set in order to encode colors that do not exist in the palette, the quantization processing is performed on the escape values themselves in order to limit an increase in the amount of code. In the quantization processing on the escape values, the corrected quantization parameters (QP', QPcb', and QPcr') are used instead of the aforementioned quantization parameters (QP, QPcb, and QPcr). This makes it possible to prevent an unnecessary increase in the amount of code when palette encoding is used, in the same manner as when transform skipping is used. Like the residual coefficients, the encoded escape values are input to the inverse quantization/inverse transform unit 106 and the encoding unit 110.

Next, the inverse quantization/inverse transform unit 106 performs inverse quantization processing, inverse orthogonal transform processing, and the like on the input residual coefficients.

Specifically, first, inverse quantization processing is performed on the residual coefficients of a sub-block using a prediction mode aside from palette encoding, such as intra prediction or inter prediction, and the orthogonal transform coefficients are reconstructed.

Whether or not an orthogonal transformation has been applied to each color component of each sub-block is determined on the basis of a transform skipping flag input from the transform/quantization unit 105. A transform skipping flag of 0 indicates that transform skipping is not used. The quantization parameter used at this time is the same as in the transform/quantization unit 105, and for the residual coefficients generated by performing the orthogonal transform processing, the aforementioned quantization parameters (QP, QPcb, and QPcr) are used for each color component.

On the other hand, if generated using transform skipping (e.g., the transform skipping flag is 1), the aforementioned corrected quantization parameters (QP', QPcb', and QPcr') are used for each color component for the residual coefficients.

In other words, for the residual coefficients generated by performing the orthogonal transform processing, the prediction error is reconstructed by performing inverse quantization using the quantization parameters (QP, QPcb, and QPcr) and furthermore performing an inverse orthogonal transform. On the other hand, for the residual coefficients generated through transform skipping, the prediction error is reconstructed by performing inverse quantization using the corrected quantization parameters (QP', QPcb', and QPcr'). The prediction error reconstructed in this manner is output to the image reconstruction unit 107.

If the sub-block has been palette-encoded, the escape value is reconstructed by performing inverse quantization using the corrected quantization parameters (QP', QPcb', and QPcr') on the quantized escape value. The reconstructed escape value is output to the image reconstruction unit 107.

In the image reconstruction unit 107, if the palette flag input from the prediction unit 104 indicates that the sub-block has not been palette-encoded, the frame memory 108 is referenced as appropriate on the basis of other prediction information, and a predictive image is reconstructed. The image data is reconstructed from the reconstructed predictive image and the reconstructed prediction error input from the inverse quantization/inverse transform unit 106, and is input to and stored in the frame memory 108. On the other hand, if the sub-block has been palette-encoded, the image data is reconstructed using an index, escape value, or the like that indicates which color in the palette is used by each pixel input as the prediction information, and is input to and stored in the frame memory 108.

The in-loop filter unit 109 reads out the reconstructed image data from the frame memory 108, and performs in-loop filter processing such as deblocking filtering. The in-loop filter processing is performed on the basis of the prediction mode of the prediction unit 104, the value of the quantization parameter used by the transform/quantization unit 105, whether or not there are non-zero values (called "significant coefficients" hereinafter) in the processed sub-blocks after quantization, sub-block division information, and the like. The filtered image is then input to the frame memory 108 again and re-stored.

The encoding unit 110 generates code data by entropy-encoding the residual coefficients generated by the transform/quantization unit 105 and the prediction information input from the prediction unit 104, in units of sub-blocks. Specifically, first, the palette flag, indicating whether or not the sub-block is palette-encoded, is encoded. If the sub-block is not palette-encoded, 0 is entropy-encoded as the palette flag input as the prediction information, followed by entropy encoding of other prediction information and residual coefficients, and the code data is generated. On the other hand, if the sub-block is palette-encoded, 1 is entropy-encoded as the palette flag, followed by encoding of an index, escape values, and the like that indicate which color in the palette is used by each pixel, and the code data is generated. The entropy encoding method is not particularly specified, but Golomb coding, arithmetic coding, Huffman coding, or the like can be used. The generated code data is output to the integrated encoding unit 111.

The integrated encoding unit 111 encodes the quantization value correction information input from the quantization value correction information generation unit 103, and generates quantization value correction information code. The encoding method is not particularly specified, but Golomb coding, arithmetic coding, Huffman coding, or the like can be used. The present embodiment assumes that, as an example, 4, which indicates a quantization step of 1, is used as a standard (initial value), and the difference value between the standard 4 and the minimum QP value QPmin, which is the quantization value correction information, is encoded through Golomb coding. In the present embodiment, QPmin is set to 4, and thus 1-bit code of "0", which is the Golomb-coded difference value of 0 from the standard of 4, is used as the quantization value correction information code. This makes it possible to minimize the amount of code in the quantization value correction information. Furthermore, when encoding a table for calculating QPcb and QPcr from the aforementioned quantization parameter QP, the table is also encoded here. A bitstream is formed by multiplexing this code data with the code data input from the encoding unit 110 and the like. The bitstream is ultimately output from the terminal 112.

Figure 6A:
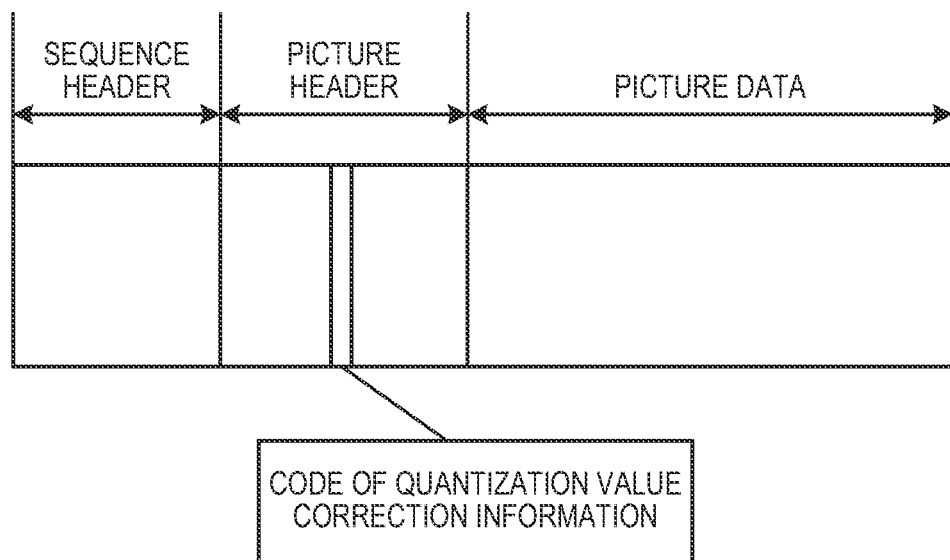
FIG. 6A is a diagram illustrating an example of the structure of a bitstream generated by the first embodiment and decoded by the second embodiment.
Figure 6B:
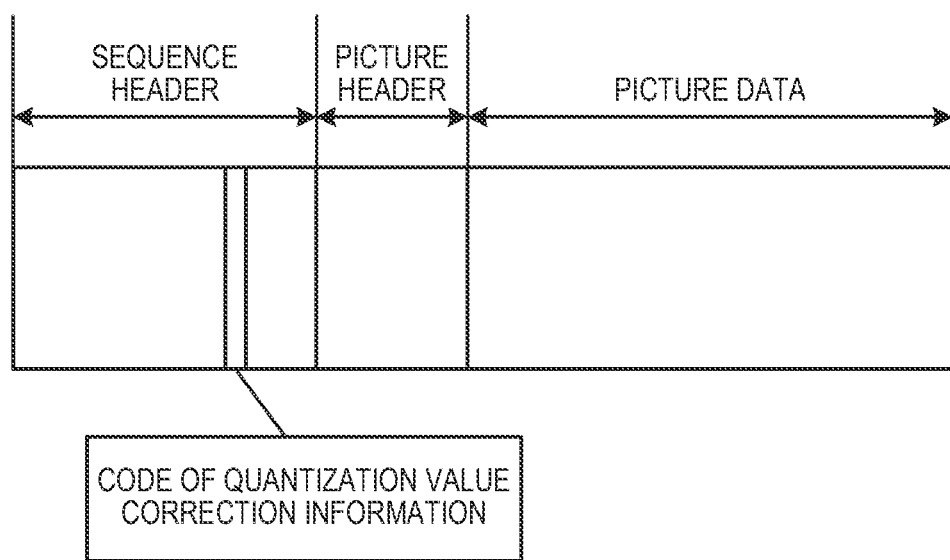
FIG. 6B is a diagram illustrating an example of the structure of a bitstream generated by the first embodiment and decoded by the second embodiment.

FIG. 6A illustrates an example of the bitstream containing the encoded quantization value correction information. Quantization control size information is included in one of the headers of the sequence, picture, or the like as quantization control size information code. The present embodiment assumes that this information is contained in the header part of the sequence, as illustrated in FIG. 6B. However, the location of the code is not limited thereto, and the information may be contained in the header part of the picture, as illustrated in FIG. 6A.

Figure 3:
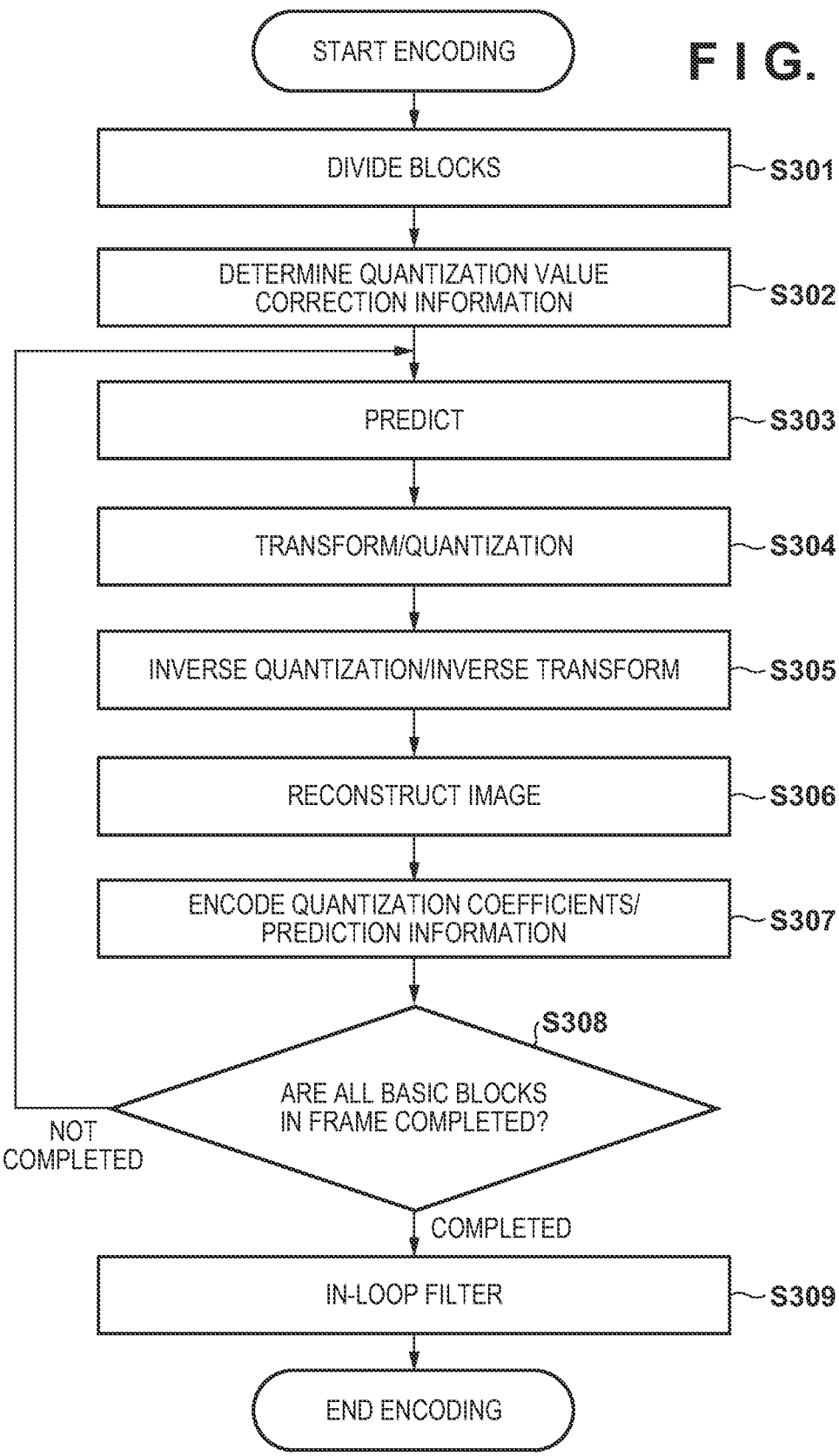
FIG. 3 is a flowchart illustrating image encoding processing in the image encoding device according to the first embodiment.

FIG. 3 is a flowchart illustrating encoding processing in the image encoding device according to the first embodiment.

First, in step S301, the block division unit 102 divides the input image, which is in units of frames, into units of basic blocks.

In step S302, the quantization value correction information generation unit 103 determines the quantization value correction information, which is information for processing of correcting the quantization parameter. The quantization value correction information is encoded by the integrated encoding unit 111.

In step S303, the prediction unit 104 performs prediction processing on the image data in the units of basic blocks generated in step S301, and generates the prediction information, such as the sub-block division and the prediction mode, as well as the predictive image data. Furthermore, the prediction error is calculated from the input image data and the predictive image data. However, in cases such as when there are few types of colors (pixel values) used in the sub-block and it can be determined that using palette encoding can compress the data more efficiently, palette encoding can be selected. The prediction unit 104 also generates the palette flag, indicating whether or not the sub-block is palette-encoded.

In step S304, if a prediction mode other than palette encoding is used for the sub-block, the transform/quantization unit 105 first determines whether or not to perform orthogonal transform processing on each color component (Y, Cb, Cr) of the prediction error calculated in step S303. The transform skipping information is then generated as a result of the determination. If it is determined that orthogonal transform processing is to be performed on the color component, an orthogonal transform is performed on the prediction error corresponding to that color component, and the orthogonal transform coefficients are generated. Then, quantization is performed using the quantization parameters (QP, QPcb, and QPcr), and the residual coefficients are generated. On the other hand, if it is determined that the orthogonal transform processing is to be skipped for the color component, quantization is performed on the prediction error corresponding to that color component using the corrected quantization parameters (QP', QPcb', and QPcr'), and the residual coefficients are generated. If the sub-block has been palette-encoded, the transform/quantization unit 105 quantizes the escape value using the corrected quantization parameters (QP', QPcb', and QPcr'), and generates a quantized escape value.

In step S305, the inverse quantization/inverse transform unit 106 performs inverse quantization processing, inverse orthogonal transform processing, and the like on the residual coefficients generated in step S304. Specifically, when a prediction mode other than palette encoding is used, the inverse quantization/inverse transform unit 106 first determines whether or not an orthogonal transform has been performed on each color component of each sub-block on the basis of the transform skipping information generated in step S304. The inverse quantization processing is performed on the residual coefficients on the basis of the result of the determination.

The quantization parameter used at this time is the same as in step S304, and for the residual coefficients generated by performing the orthogonal transform processing, the aforementioned quantization parameters (QP, QPcb, and QPcr) are used for each color component.

On the other hand, for the residual coefficients generated with transform skipping, the aforementioned corrected quantization parameters (QP', QPcb', and QPcr') are used for each color component. In other words, for the residual coefficients generated by performing the orthogonal transform processing, the prediction error is reconstructed by performing inverse quantization using the quantization parameters (QP, QPcb, and QPcr) and furthermore performing an inverse orthogonal transform. On the other hand, for the residual coefficients generated through transform skipping, the prediction error is reconstructed by performing inverse quantization using the corrected quantization parameters (QP', QPcb', and QPcr').

Additionally, if the sub-block has been palette-encoded, the escape value is reconstructed by performing inverse quantization using the corrected quantization parameters (QP', QPcb', and QPcr') on the escape value quantized in step S304.

In step S306, if the palette flag generated in step S303 indicates that the sub-block is not palette-encoded, the image reconstruction unit 107 reconstructs the predictive image on the basis of the prediction information generated in step S303. The image data is further reconstructed from the reconstructed predictive image and the prediction error generated in step S305. On the other hand, if the palette flag indicates that the sub-block has been palette-encoded, the image reconstruction unit 107 reconstructs the image data using an index, escape value, or the like that indicates which color in the palette is used by each pixel.

In step S307, the encoding unit 110 encodes the prediction information generated in step S303 and the residual coefficients generated in step S304, and generates the code data. Specifically, first, the palette flag, indicating whether or not the sub-block is palette-encoded, is encoded. If the sub-block is not palette-encoded, 0 is entropy-encoded as the palette flag input as the prediction information, followed by entropy encoding of other prediction information and residual coefficients, and the code data is generated.

On the other hand, if the sub-block is palette-encoded, 1 is entropy-encoded as the palette flag, followed by encoding of an index, escape values, and the like that indicate which color in the palette is used by each pixel, and the code data is generated. Furthermore, other code data is also included to generate a bitstream.

In step S308, the image encoding device determines whether or not the encoding of all the basic blocks in the frame has been completed; if so, the sequence moves to step S309, and if not, the sequence returns to step S303 for the next basic block.

In step S309, the in-loop filter unit 109 performs the in-loop filter processing on the image data reconstructed in step S306, generates the filtered image, and ends the processing.

The above configuration and operations make it possible to prevent an unnecessary increase in the amount of code, particularly by generating the quantization value correction information in step S302 and using a quantization parameter corrected on the basis of the quantization value correction information in steps S304 and S305. As a result, the overall amount of data in the generated bitstream can be suppressed, and the encoding efficiency can be improved.

Although the present embodiment describes a configuration in which the quantization parameter corresponding to each color component, namely Y, Cb, and Cr, is corrected, the present invention is not limited thereto. For example, a different quantization parameter QPcbcr is used for the common encoding of chroma residual coefficients, which encodes the residual coefficients of Cb and Cr together and is under investigation for VVC, and that quantization parameter may be applied here.

$$QPcbcr' = \text{Max}(QPmin, WPcbcr) \quad (4)$$

In other words, as indicated by the above Formula (4), the configuration may be such that a corrected quantization parameter QPcbcr' is used to quantize the prediction error for which the transform is skipped and the chroma residual coefficients are encoded in common. This makes it possible to appropriately correct the quantization parameter for prediction error for which the transform is skipped and the chroma residual coefficients are encoded in common, which in turn makes it possible to prevent an unnecessary increases in the amount of code. In addition, because the quantization step is not unnecessarily small, the processing load can be reduced.

Additionally, although the present embodiment describes a configuration in which the quantization values are uniformly corrected on the basis of a single instance of the quantization value correction information, separate instances of the quantization value correction information may be used for each color component, or for transform skipping and palette encoding. Specifically, the configuration may be such that instead of QPmin, QPminY is defined for luma, QPmincb for Cb, and QPmincr for Cr individually, and individual quantization value correction is performed for each color component. In particular, when the bit depth differs depending on the color component, this makes it possible to correct the quantization parameter optimally according to the bit depth. Likewise, the configuration may be such that instead of QPmin, QPminTS is defined for transform skipping and QPminPLT for palette encoding individually, and different quantization value correction are made according to each case. In particular, when the bit depth of the input pixel values differs from the bit depth used in the palette encoding, this makes it possible to correct the quantization parameter optimally according to each case.

Note that the quantization parameter may be corrected when either transform skipping or palette encoding is used. Even in this case, the likelihood of unnecessarily increasing the amount of code can be reduced. However, correcting the quantization parameters in both cases can further reduce the possibility of unnecessarily increasing the amount of code.

Second Embodiment

Figure 2:
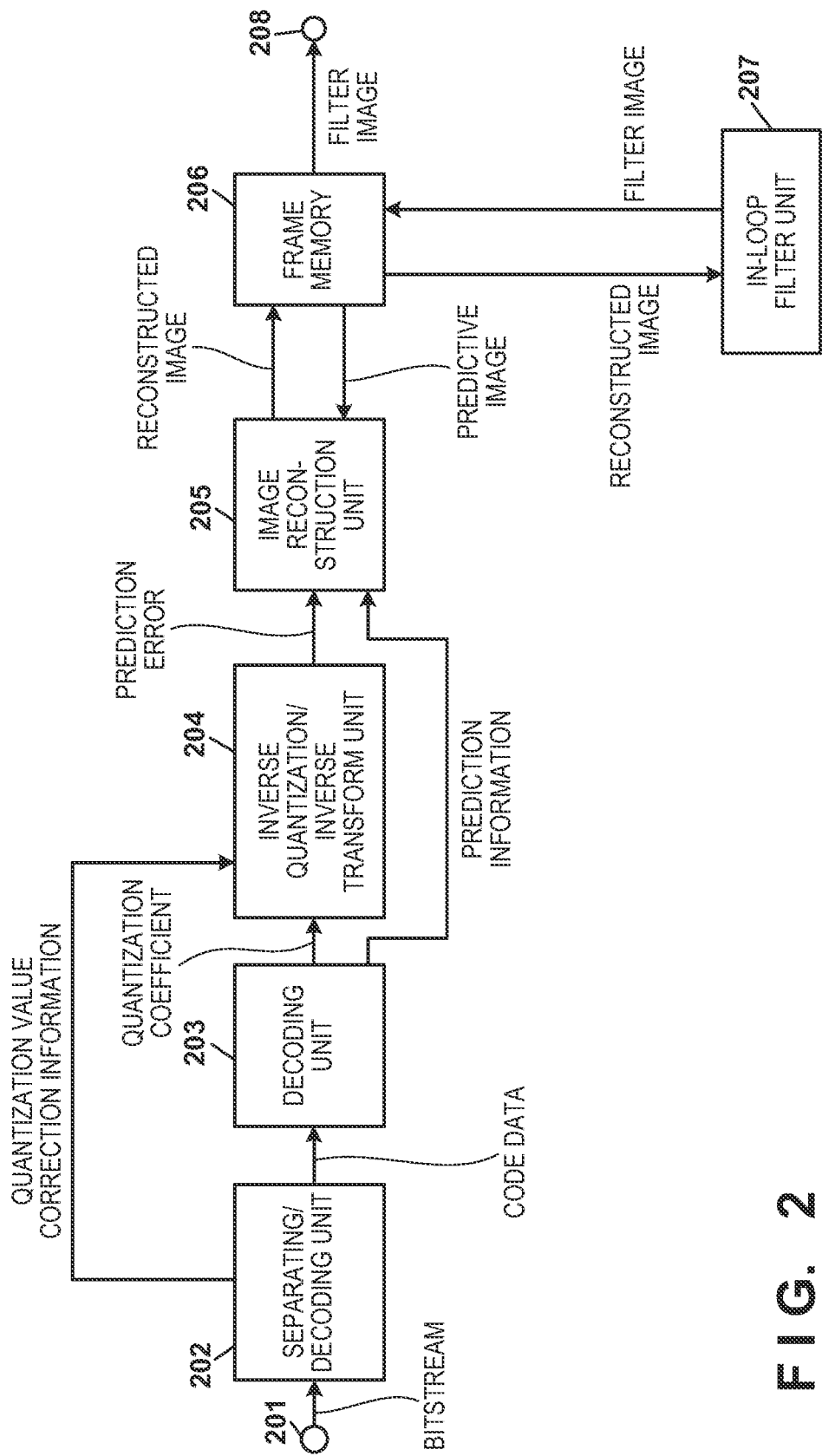
FIG. 2 is a block diagram illustrating the configuration of an image decoding device according to a second embodiment.

FIG. 2 is a block diagram illustrating the configuration of an image decoding device according to a second embodiment of the present invention. The present embodiment will describe the decoding of the encoded data generated in the first embodiment as an example. The image decoding device basically performs the reverse operations of the image encoding device of the first embodiment.

201 is a terminal into which the encoded bitstream is input.

202 is a separating/decoding unit, which separates information pertaining to decoding processing, code data pertaining to coefficients, and the like from the bitstream, and decodes them. The separating/decoding unit 202 also decodes code data present in the header part of the bitstream. In the present embodiment, the quantization value correction information is reconstructed (decoded) and output to later stages. The separating/decoding unit 202 performs the reverse of the operations of the integrated encoding unit 111 in FIG. 1.

203 is a decoding unit, which decodes the code data input from the separating/decoding unit 202, and reconstructs the residual coefficients and the prediction information.

204 is an inverse quantization/inverse transform unit which, like reference numeral 106 in FIG. 1, inputs the residual coefficients in units of sub-blocks, obtains transform coefficients by performing inverse quantization, furthermore performs an inverse orthogonal transform, and reconstructs the prediction error. However, if transform skipping, palette encoding, or the like is used, the inverse orthogonal transform processing is not performed. Additionally, the function for performing the inverse quantization and the function for performing the inverse orthogonal transform may be provided separately. Note that the inverse quantization/inverse transform unit 204 also functions as a determination means for determining what kind of encoding is to be performed on the basis of a flag or the like.

Note that information indicating the quantization parameter is also decoded from the bitstream by the decoding unit 203. For example, the information indicating the quantization parameter is a difference value between the target quantization parameter and another quantization parameter (e.g., the quantization parameter of the previous sub-block). The other quantization parameter may be information that indicates a difference value between an average value of a plurality of quantization parameters of a plurality of other sub-blocks and the target quantization parameter. The inverse quantization/inverse transform unit 204 derives the target quantization parameter by, for example, adding this difference value to other quantization parameters. For the first quantization parameter, the quantization parameter can be derived by adding the difference value to an initial value decoded separately. The aforementioned corrected quantization parameter is derived by correcting the quantization parameter derived in this manner.

206 is frame memory. This frame memory stores the image data of the reconstructed picture.

205 is an image reconstruction unit. The image reconstruction unit 205 generates the predictive image data by referring to the frame memory 206 as appropriate on the basis of the input prediction information. The method of generating the predictive image data here is the same as that of the prediction unit 104 in the first embodiment, and prediction methods such as intra prediction and inter prediction are used. A prediction method that combines intra prediction and inter prediction may also be used, as described earlier. Additionally, as in the first embodiment, the prediction processing is performed in sub-block units. Reconstructed image data is then generated from the predictive image data and the prediction error reconstructed by the inverse quantization/inverse transform unit 204, and is output.

207 is an in-loop filter unit. Like reference numeral 109 in FIG. 1, the in-loop filter unit 207 performs in-loop filter processing, such as deblocking filtering, on the reconstructed image, and then outputs the filtered image.

208 is a terminal, which outputs the reconstructed image data to the exterior. The reconstructed image is output to an external display device or the like, for example.

Operations for decoding an image performed by the image decoding device will be described hereinafter. In the present embodiment, the bitstream generated in the first embodiment is decoded.

In FIG. 2, the bitstream, input from the terminal 201, is input to the separating/decoding unit 202. The separating/decoding unit 202 separates information pertaining to decoding processing, code data pertaining to coefficients, and the like from the bitstream. The separating/decoding unit 202 also decodes code data present in the header part of the bitstream. Specifically the quantization value correction information is reconstructed (decoded). In the present embodiment, first, the quantization value correction information code is extracted from the sequence header of the bitstream, illustrated in FIG. 6B, and decoded. Specifically, the 1-bit code "0" that was Golomb-encoded in the first embodiment is Golomb-decoded to obtain 0, and furthermore 4, obtained by adding the standard of 4 to the 0, is set as QPmin, which is the quantization value correction information. The quantization value correction information obtained in this manner is output to the inverse quantization/inverse transform unit 204. Then, code data in units of basic blocks of the picture data is reconstructed and output to the decoding unit 203 as well.

The decoding unit 203 decodes the code data and reconstructs the residual coefficients, the prediction information, and the quantization parameter. The reconstructed residual coefficients, quantization parameter, and the like are output to the inverse quantization/inverse transform unit 204, and the reconstructed prediction information is output to the image reconstruction unit 205. The reconstructed prediction information includes information pertaining to the sub-block division in the basic block, as well as the palette flag, transform skipping information, and the like.

The inverse quantization/inverse transform unit 204 performs inverse quantization, an inverse orthogonal transform, and the like on the input residual coefficients. Specifically, first, it is determined whether or not the sub-block to be decoded is palette-encoded on the basis of the palette flag input from the decoding unit 203.

If the sub-block is not palette-encoded, inverse quantization processing is performed on the residual coefficients of the sub-block, and the orthogonal transform coefficients are reconstructed. The quantization parameter used in the inverse quantization processing changes depending on whether or not the residual coefficients corresponding to each color component have undergone orthogonal transform processing, and whether or not orthogonal transform processing has been performed is determined on the basis of the transform skipping information input from the decoding unit 203. The quantization parameter used in this inverse quantization processing is the same as with the inverse quantization/inverse transform unit 106 of the first embodiment, and for the residual coefficients generated by performing the orthogonal transform processing, the aforementioned quantization parameters (QP, QPcb, and QPcr) are used for each color component.

On the other hand, for the residual coefficients generated with transform skipping, the aforementioned corrected quantization parameters (QP', QPcb', and QPcr') are used for each color component. In other words, for the residual coefficients generated by performing the orthogonal transform processing, the prediction error is reconstructed by performing inverse quantization using the quantization parameters (QP, QPcb, and QPcr) and furthermore performing an inverse orthogonal transform.

The prediction information reconstructed in this manner is output to the image reconstruction unit 205.

If the sub-block to be decoded has been palette-encoded, the escape value is reconstructed by performing inverse quantization using the corrected quantization parameters (QP', QPcb', and QPcr') on the quantized escape value input from the decoding unit 203. The reconstructed escape value is output to the image reconstruction unit 205. Note that the values in the sub-block that have been reconstructed using values aside from the escape values (the values of colors contained in the palette indicated by the index) are also output to the image reconstruction unit 205 along with the escape values. The predictive image is constituted by these values output to the image reconstruction unit 205.

In the image reconstruction unit 205, if the palette flag input from the decoding unit 203 indicates that the sub-block has not been palette-encoded, the frame memory 206 is referenced as appropriate on the basis of other prediction information, and a predictive image is reconstructed. Image data is reconstructed from the predictive image and the prediction error input from the inverse quantization/inverse transform unit 204, and is input to and stored in the frame memory 206. Specifically, the image reconstruction unit 205 reconstructs the image data by adding the predictive image and the prediction error.

On the other hand, if the palette flag indicates that the sub-block has been palette-encoded, the image data is reconstructed using an index that indicates which color in the palette is used by each pixel, an escape value, or the like input as the prediction information. The image data is then input to and stored in the frame memory 206. The stored image data is used for reference during prediction.

Like reference numeral 109 in FIG. 1, the in-loop filter unit 207 reads out the reconstructed image data from the frame memory 206, and performs in-loop filter processing such as deblocking filtering, sample adaptive offset, and the like. The filtered image is then input to the frame memory 206 again.

The reconstructed image stored in the frame memory 206 is ultimately output from the terminal 208 to the exterior.

Figure 4:
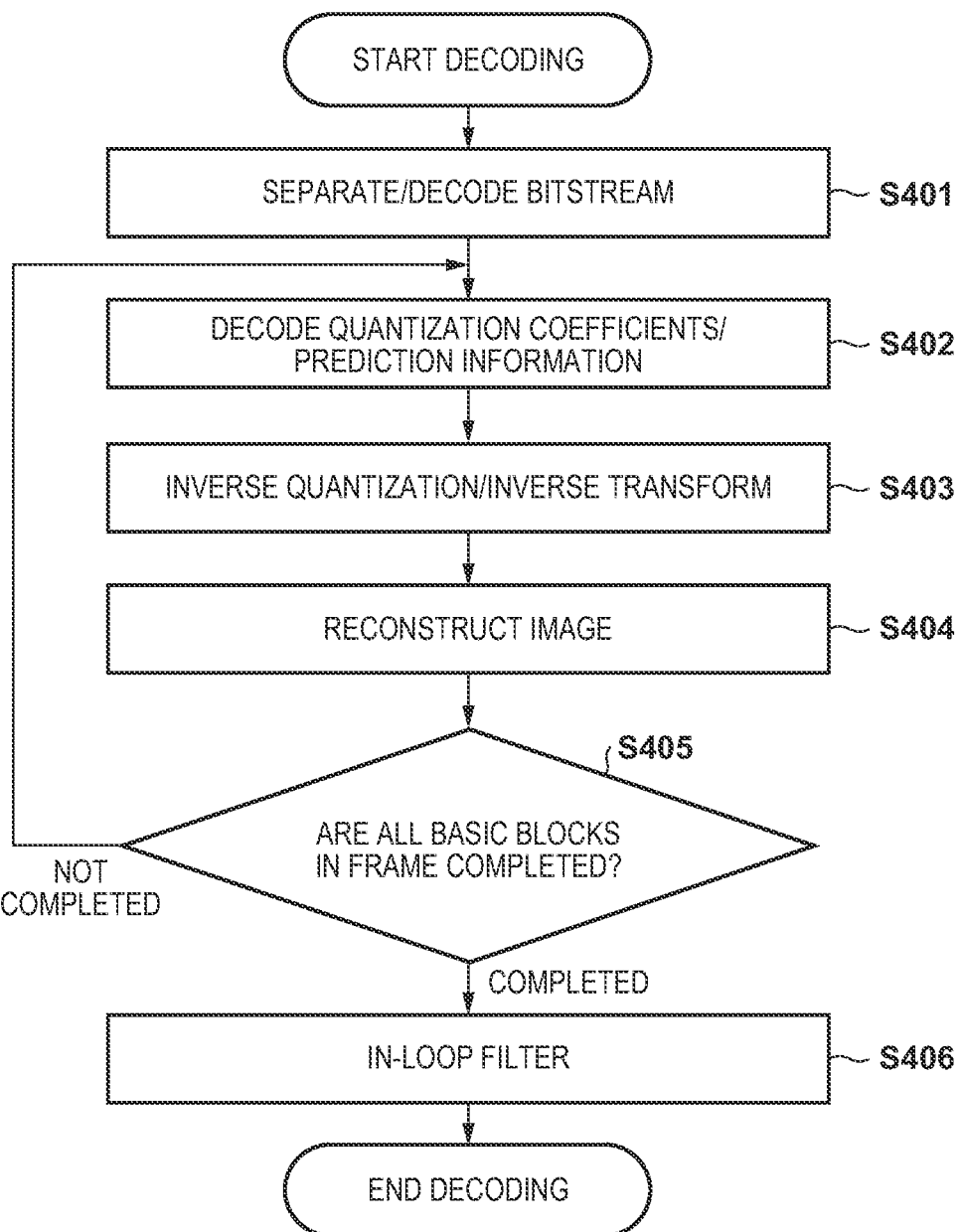
FIG. 4 is a flowchart illustrating image decoding processing in the image decoding device according to the second embodiment.

FIG. 4 is a flowchart illustrating image decoding processing in the image decoding device according to the second embodiment.

First, in step S401, the separating/decoding unit 202 separates the information pertaining to decoding processing, the code data pertaining to coefficients, and the like from the bitstream, decodes the code data of the header part, and reconstructs the quantization value correction information.

In step S402, the decoding unit 203 decodes the code data separated in step S401 and reconstructs the residual coefficients, the prediction information, and the quantization parameter. More specifically, first, the palette flag, indicating whether or not the sub-block to be decoded is palette-encoded, is reconstructed. If the reconstructed palette flag indicates 0, i.e., the sub-block is not palette-encoded, other prediction information, residual coefficients, transform skipping information, and the like are then reconstructed. On the other hand, if the reconstructed palette flag indicates 1, i.e., the sub-block is palette-encoded, the index indicating which color in the palette is used by each pixel, the quantized escape value, and the like are reconstructed.

In step S403, if the sub-block to be decoded is not palette-encoded, the inverse quantization/inverse transform unit 204 first determines whether or not an orthogonal transform has been performed on each color component of the sub-block, on the basis of the transform skipping information reconstructed in step S402.
The inverse quantization processing is performed on the residual coefficients on the basis of the result of the determination.
The quantization parameter used at this time is the same as in step S305 of the first embodiment, and for the residual coefficients generated by performing the orthogonal transform processing, the aforementioned quantization parameters (QP, QPcb, and QPcr) are used for each color component.

On the other hand, for the residual coefficients generated with transform skipping, the aforementioned corrected quantization parameters (QP', QPcb', and QPcr') are used for each color component. In other words, for the residual coefficients generated by performing the orthogonal transform processing, the prediction error is reconstructed by performing inverse quantization using the quantization parameters (QP, QPcb, and QPcr) and furthermore performing an inverse orthogonal transform. On the other hand, for the residual coefficients generated through transform skipping, the prediction error is reconstructed by performing inverse quantization using the corrected quantization parameters (QP', QPcb', and QPcr').

Additionally, if the sub-block has been palette-encoded, the escape value is reconstructed by performing inverse quantization using the corrected quantization parameters (QP', QPcb', and QPcr') on the quantized escape value reconstructed in step S402.

In step S404, if the palette flag reconstructed in step S402 indicates that the sub-block is not palette-encoded, the image reconstruction unit 205 reconstructs the predictive image on the basis of the prediction information generated in step S402. The image data is further reconstructed from the reconstructed predictive image and the prediction error generated in step S403.

Additionally, if the palette flag indicates that the sub-block has been palette-encoded, the image reconstruction unit 205 reconstructs the image data using an index, escape value, or the like that indicates which color in the palette is used by each pixel.

In step S405, the image decoding device determines whether or not the decoding of all the basic blocks in the frame has been completed; if so, the sequence moves to step S406, and if not, the sequence returns to step S402 for the next basic block.

In S406, the in-loop filter unit 207 performs in-loop filter processing on the image data reconstructed in step S404 and generates a filtered image, after which the processing ends.

According to the above-described configuration and operations, it is possible to decode a bitstream with less of an unnecessary increase in the amount of code by using the quantization parameter generated in the first embodiment and corrected on the basis of the quantization value correction information.

Although it is assumed that a bitstream in which the quantization control size information is included in the sequence header part is decoded in the present embodiment as illustrated in FIG. 6B, the encoding location of the information is not limited thereto. The information may be encoded in the picture header part of the image as illustrated in FIG. 6A, or in another location.

Although the present embodiment describes a configuration in which the quantization parameter corresponding to each color component, namely Y, Cb, and Cr, is corrected, the present invention is not limited thereto. The configuration may be such that the residual coefficients for which the transform is skipped and the chroma residual coefficients are encoded in common are inverse-quantized using QPcbcr', which is the corrected quantization parameter calculated through the aforementioned Formula (4). This makes it possible to appropriately correct the quantization parameter for residual coefficients for which the transform is skipped and the chroma residual coefficients are encoded in common, which in turn makes it possible to decode a bitstream that prevents an unnecessary increases in the amount of code. In addition, because the quantization step is not unnecessarily small, the processing load can be reduced.

Additionally, although the present embodiment describes a configuration in which the quantization values are uniformly corrected on the basis of a single instance of the quantization value correction information, separate instances of the quantization value correction information may be used for each color component, or for transform skipping and palette encoding. Specifically, the configuration may be such that instead of QPmin, QPminY is defined for luma, QPmincb for Cb, and QPmincr for Cr individually, and individual quantization value correction is performed for each color component. In particular, when the bit depth differs depending on the color component, this makes it possible to correct the quantization parameter optimally according to the bit depth. Likewise, the configuration may be such that instead of QPmin, QPminTS is defined for transform skipping and QPminPLT for palette encoding individually, and different quantization value correction are made according to each case. In particular, when the bit depth of the output pixel values differs from the bit depth used in the palette encoding, this makes it possible to correct the quantization parameter optimally according to each case.

Note that the quantization parameter may be corrected when either transform skipping or palette encoding is used. Even in this case, the likelihood of unnecessarily increasing the amount of code can be reduced. However, correcting the quantization parameters in both cases can further reduce the possibility of unnecessarily increasing the amount of code.

Third Embodiment

Each of the processing units illustrated in FIGS. 1 and 2 was described in the foregoing embodiments as being configured as hardware. However, the processing performed by the processing units illustrated in the drawings may be configured by a computer program.

Figure 5:
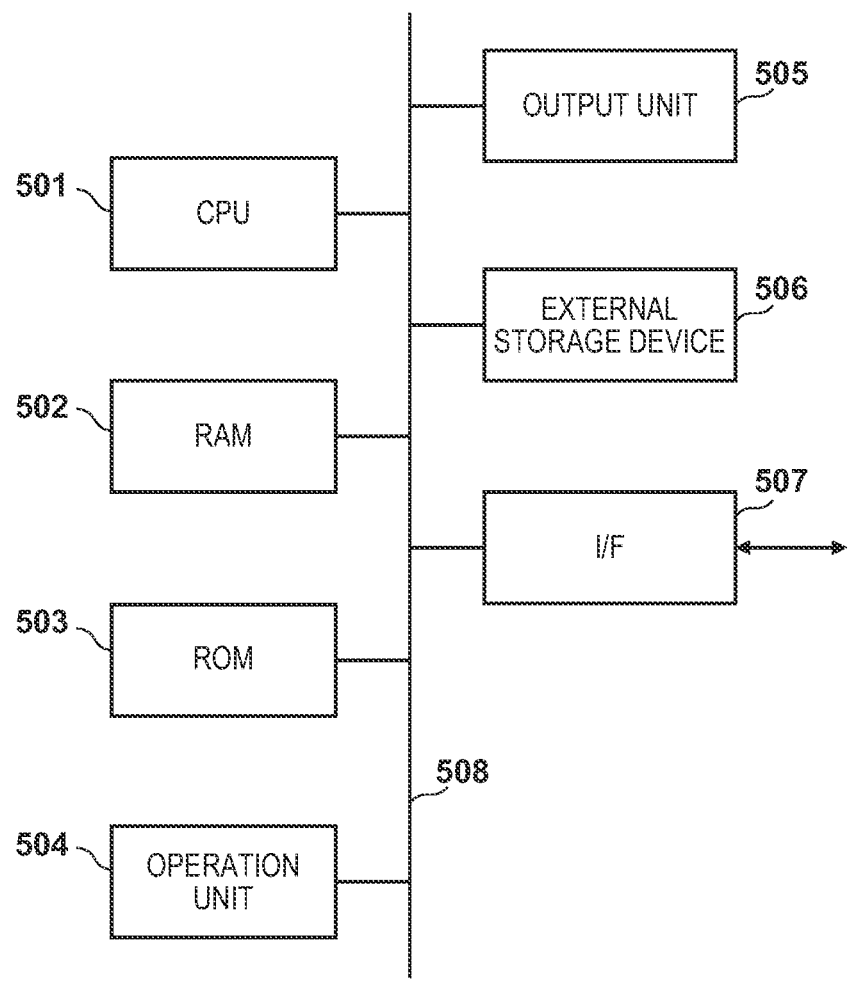
FIG. 5 is a block diagram illustrating an example of the hardware configuration of a computer in which the image encoding device and the image decoding device according to the foregoing embodiments can be applied.

FIG. 5 is a block diagram illustrating an example of the hardware configuration of a computer in which the image encoding device and the image decoding device according to the foregoing embodiments can be applied.

A CPU 501 controls the computer as a whole using computer programs, data, and the like stored in RAM 502, ROM 503, and the like, and executes the processing described above as processing performed by an image processing device according to the foregoing embodiments. In other words, the CPU 501 functions as the processing units illustrated in FIGS. 1 and 2. Various types of hardware processors aside from a CPU can also be used.

The RAM 502 has an area for temporarily storing computer programs, data, and the like loaded from an external storage device 506, data obtained from the exterior via an IN (interface) 507, and the like. The RAM 502 further has a work area used by the CPU 501 when executing various processes. In other words, the RAM 502, for example, can be allocated as frame memory, or may provide various other areas as appropriate.

Configuration data, a boot program, and so on for the computer are stored in the ROM 503. An operation unit 504 is constituted by a keyboard, a mouse, and the like, and by manipulating the operation unit 504, a user of the computer can input various types of instructions to the CPU 501. A display unit 505 displays results of processing by the CPU 501. The display unit 505 is constituted by a liquid crystal display, for example.

The external storage device 506 is a high-capacity information storage device as typified by a hard disk drive device. The external storage device 506 stores an OS (operating system), computer programs for causing the CPU 501 to implement the functions of each unit illustrated in FIGS. 1 and 2, and the like. The image data to be processed may also be stored in the external storage device 506.

The computer programs, data, and the like stored in the external storage device 506 are loaded into the RAM 502 as appropriate under the control of the CPU 501, and are then processed by the CPU 501. Networks such as LANs and the Internet, other devices such as projection devices and display devices, and the like can be connected to the I/F 507, and the computer can obtain and send various information via this I/F 507. 508 indicates a bus that connects the aforementioned units to each other.

The operations achieved by the above-described configuration are controlled by the CPU 501, which primarily performs the operations illustrated in the aforementioned flowcharts.

According to the present invention, the likelihood of unnecessarily increasing an amount of code can be reduced by adaptively correcting a quantization parameter.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image encoding device encoding an image to generate a bitstream, comprising:
    a first determining unit configured to, in a case where a prediction encoding mode is used for a block to be encoded, determine whether a transforming processing is applied to the block to be encoded; and
    an encoding unit configured to, in a case where the first determining unit determines that the transforming processing is applied to the block to be encoded, encode the block to be encoded using a first quantization parameter corresponding to the block to be encoded,
    wherein, in a case where (i) the first determining unit determines that the transforming processing is not applied to the block to be encoded and (ii) the first quantization parameter is less than a minimum quantization parameter value used for a case where the transforming processing is not applied, the encoding unit encodes the block to be encoded using the minimum quantization parameter value as a quantization parameter,
    wherein the device further comprises:
    a second determining unit configured to determine whether a palette mode is applied to the block to be encoded,
    wherein, in a case where (i) the second determining unit determines that the pallet mode is applied to the block to be encoded and (ii) the first quantization parameter is less than the minimum quantization parameter value, the encoding unit encodes the block to be encoded using the minimum quantization parameter value as a quantization parameter for an escape value,
    wherein the minimum quantization parameter value used when the first determining unit determines that the transforming processing is not applied to the block to be encoded and the minimum quantization parameter value used for the escape value are the same, and
    wherein the encoding unit further encodes, into the bitstream, information for indicating a difference between the minimum quantization parameter value and a predetermined value corresponding to a value of a quantization parameter indicating that a quantization step is one.

2. An image decoding device decoding a bitstream generated by encoding an image, comprising:
    a first determining unit configured to, in a case where a prediction encoding mode is used for a block to be decoded, determine whether a transforming processing is applied to the block to be decoded; and
    a decoding unit configured to, in a case where the first determining unit determines that the transforming processing is applied to the block to be decoded, decode the block to be decoded using a first quantization parameter corresponding to the block to be decoded, wherein the decoding unit further decodes, from the bitstream, information for indicating a difference between a minimum quantization parameter value for a case where the transforming processing is not applied and a predetermined value corresponding to a value of a quantization parameter indicating that a quantization step is one, wherein, in a case where (i) the first determining unit determines that the transforming processing is not applied to the block to be decoded and (ii) the first quantization parameter is less than the minimum quantization parameter value based on the information, the decoding unit decodes the block to be decoded using the minimum quantization parameter value as a quantization parameter, wherein the device further comprises:

a second determining unit configured to determine whether a palette mode is applied to the block to be decoded, wherein, in a case where (i) the second determining unit determines that the pallet mode is applied to the block to be decoded and (ii) the first quantization parameter is less than the minimum quantization parameter value, the decoding unit decodes the block to be decoded using the minimum quantization parameter value as a quantization parameter for an escape value, and wherein the minimum quantization parameter value used when the first determining unit determines that the transforming processing is not applied to the block to be decoded and the minimum quantization parameter value used for the escape value are the same.

3. An image encoding method of encoding an image to generate a bitstream, comprising:

in a case where a prediction encoding mode is used for a block to be encoded, determining whether a transforming processing is applied to the block to be encoded;

in a case where it is determined that the transforming processing is applied to the block to be encoded, encoding the block to be encoded using a first quantization parameter corresponding to the block to be encoded;

in a case where (i) it is determined that the transforming processing is not applied to the block to be encoded and (ii) the first quantization parameter is less than a minimum quantization parameter value for a case where the transforming processing is not applied, encoding the block to be encoded using the minimum quantization parameter value as a quantization parameter;

determining whether a palette mode is applied to the block to be encoded; and in a case where (i) it is determined that the pallet mode is applied to the block to be encoded and (ii) the first quantization parameter is less than the minimum quantization parameter value, encoding the block to be encoded using the minimum quantization parameter value as a quantization parameter for an escape value, wherein the minimum quantization parameter value used when it is determined that the transforming processing is not applied to the block to be encoded and the minimum quantization parameter value used for the escape value are the same, and wherein the image encoding method further comprises encoding, into the bitstream, information for indicating a difference between the minimum quantization parameter value and a predetermined value corresponding to a value of a quantization parameter indicating that a quantization step is one.

4. An image decoding method of decoding a bitstream generated by encoding an image, the method comprising:

in a case where a prediction encoding mode is used for a block to be decoded, determining whether a transforming processing is applied to the block to be decoded;

in a case where it is determined that the transforming processing is applied to the block to be decoded, decoding the block to be decoded using a first quantization parameter corresponding to the block to be decoded;

decoding, from the bitstream, information for indicating a difference between a minimum quantization parameter value for a case where the transforming processing is not applied and a predetermined value corresponding to a value of a quantization parameter indicating that a quantization step is one;

in a case where (i) it is determined that the transforming processing is not applied to the block to be decoded and (ii) the first quantization parameter is less than the minimum quantization parameter value based on the information, decoding the block to be decoded using the minimum quantization parameter value as a quantization parameter;

determining whether a palette mode is applied to the block to be decoded; and in a case where (i) it is determined that the pallet mode is applied to the block to be decoded and (ii) the first quantization parameter is less than the minimum quantization parameter value, decoding the block to be decoded using the minimum quantization parameter value as a quantization parameter for an escape value, wherein the minimum quantization parameter value used when it is determined that the transforming processing is not applied to the block to be decoded and the minimum quantization parameter value used for the escape value are the same.

5. A non-transitory computer-readable storage medium storing a program which, when read and executed by a computer, causes the computer to execute an image encoding method of encoding an image to generate a bitstream, the method comprising:

in a case where a prediction encoding mode is used for a block to be encoded, determining whether a transforming processing is applied to the block to be encoded;

in a case where it is determined that the transforming processing is applied to the block to be encoded, encoding the block to be encoded using a first quantization parameter corresponding to the block to be encoded;

in a case where (i) it is determined that the transforming processing is not applied to the block to be encoded and (ii) the first quantization parameter is less than a minimum quantization parameter value for a case where the transforming processing is not applied, encoding the block to be encoded using the minimum quantization parameter value as a quantization parameter;

determining whether a palette mode is applied to the block to be encoded; and in a case where (i) it is determined that the pallet mode is applied to the block to be encoded and (ii) the first quantization parameter is less than the minimum quantization parameter value, encoding the block to be encoded using the reference minimum quantization parameter value as a quantization parameter for an escape value, wherein the minimum quantization parameter value used when it is determined that the transforming processing is not applied to the block to be encoded and the minimum quantization parameter value used for the escape value are the same, and wherein the image encoding method further comprises encoding, into the bitstream, information for indicating a difference between the minimum quantization parameter value and a predetermined value corresponding to a value of a quantization parameter indicating that a quantization step is one.

6. A non-transitory computer-readable storage medium storing a program which, when read and executed by a computer, causes the computer to execute an image decoding method of decoding a bitstream generated by encoding an image, the method comprising:

in a case where a prediction encoding mode is used for a block to be decoded, determining whether a transforming processing is applied to the block to be decoded;

in a case where it is determined that the transforming processing is applied to the block to be decoded, decoding the block to be decoded using a first quantization parameter corresponding to the block to be decoded;

decoding, from the bitstream, information for indicating a difference between a minimum quantization parameter value for a case where the transforming processing is not applied and a predetermined value corresponding to a value of a quantization parameter indicating that a quantization step is one;

in a case where (i) it is determined that the transforming processing is not applied to the block to be decoded and (ii) the first quantization parameter is less than the minimum quantization parameter value based on the information, decoding the block to be decoded using the minimum quantization parameter value as a quantization parameter;

determining whether a palette mode is applied to the block to be decoded; and in a case where (i) it is determined that the pallet mode is applied to the block to be decoded and (ii) the first quantization parameter is less than the minimum quantization parameter value, decoding the block to be decoded using the minimum quantization parameter value as a quantization parameter for an escape value, wherein the minimum quantization parameter value used when it is determined that the transforming processing is not applied to the block to be decoded and the minimum quantization parameter value used for the escape value are the same.

* * * * *